Patented Oct. 25, 1932

1,884,798

UNITED STATES PATENT OFFICE

GEORGE P. MEADE, OF GRAMERCY, LOUISIANA, AND RALPH N. TRAXLER, OF RAHWAY, NEW JERSEY, ASSIGNORS TO CUBAN-AMERICAN SUGAR COMPANY, OF NEW YORK, N. Y., A CORPORATION OF NEW JERSEY

EXTRACTION OF SUGAR FROM CANE MOLASSES AND THE LIKE

No Drawing.   Application filed November 22, 1929. Serial No. 409,420.

This invention relates to the extraction of sugar from cane molasses and the like.

The recovery of sugar from beet molasses by precipitation with barium alkaline compounds has been practiced successfully, but difficulties have been experienced in applying a similar method to cane molasses, owing to the presence of glucose therein. Although it has been recognized that barium alkaline compounds will react with and destroy glucose, it has been thought necessary, in order to avoid the difficulties caused by the presence of the glucose, to apply a preliminary step in the treatment of cane molasses before precipitating sugar therefrom. Thus, it has been suggested to regulate and reduce the proportion of glucose present as a preliminary step, or to precipitate the glucose by means of barium silicate and to remove it as a preliminary step.

We have invented a method by which sugar may be successfully extracted from cane molasses by barium precipitation without any preliminary step. Our method eliminates the difficulties previously encountered by preventing the precipitation of the barium-glucose reaction products until after the precipitated sugar has been removed from the solution by filtration. We have discovered that the glucose decomposition products formed by the reaction of barium with glucose may be held in solution, so that they do not contaminate the precipitated sugar or interfere with the filtration, by keeping the solution from barium silicate and maintaining in it an alkaline concenration in excess of five per cent and preferably at least six per cent until the completion of the filtration.

Our process may be carried out by adding to a cane molasses, or any sugar solution containing glucose, a barium hydroxide solution free from barium silicate and containing sufficient barium to react with and destroy all the glucose present, and to unite with all the sugar present as barium saccharate and, in addition, an excess of barium hydroxide which, when figured in non-hydrolized form, BaO, is in excess of five per cent of the total water present in the mixed sugar and barium hydroxide solutions. For greatest efficiency, the excess barium hydroxide, figured in non-hydrolized form, BaO, should be not less than six per cent of the total water present and the temperature of the mixed solution should be maintained from at 85° to 95° C.

The sugar is precipitated as barium saccharate, and the various compounds formed by reaction of the barium with the glucose are maintained in solution. The barium saccharate precipitate is then separated by filtration, from the mother liquor which contains the glucose decomposition products and the excess of dissolved barium alkali. The filtration may easily be accomplished, owing to the absence of precipitated glucose decomposition products which, because of their colloidal form, have heretofore rendered such filtration of cane molasses difficult. In order to secure a complete separation of the barium saccharate from the mother liquor, a washing of the filter cake is necessary. A feature of our process consists in utilizing as the first wash a barium solution having an alkalinity at least equal to that which should be maintained in the mother liquor, so that the washing does not result in precipitation in the filter cake of any of the glucose decomposition products held in solution in the alkaline mother liquor.

The saccharate filter cake may be treated in any usual manner to release and recover the sugar contained therein.

The mother liquor is treated with sulphurous acid, or other mineral acid, to recover the barium which is contained therein both in the form of dissolved alkali and in the form of salts of organic acids produced by the decomposition of the glucose. The latter part of the barium cannot be released by weak acids, such as carbonic acid. The barium is recovered in the form of an insoluble salt of the mineral acid used, for example, as barium sulphite.

Our method may be successfully applied to any cane molasses, or any other sugar solution containing glucose, regardless of the ratio in which the sucrose and glucose are present in the molasses or solution. In order to apply our method to any specific cane molasses, or other solution, the sugar, glucose and water contents of the molasses, or solution, must first be determined. When these are known, the quantity of barium necessary may be determined approximately by the following empirical rule: Six atoms of barium for each five molecules of sucrose, plus two atoms of barium for each one molecule of glucose.

The necessary concentration of the barium hydroxide solution depends upon the water content of the molasses, that is to say, the greater amount of water in the molasses, the greater must be the concentration of the barium solution in order that the excess barium hydroxide may maintain the required percentage of alkalinity in the mixed solutions after the reactions of the barium with the glucose and sucrose. In commercial practice, the desired alkaline concentration in the mixed solutions may most easily be obtained by using a heavy molasses (57° Bé. or above) and a strong barium hydroxide solution, preferably about twenty per cent.

The barium hydroxide solution should consist entirely, or in large part, of barium oxide dissolved in water. We have discovered, however, that equally good results may be obtained by dissolving in water a mixture of barium oxide and barium sulphide, provided that the barium sulphide does not amount to over twenty per cent of the mixed compounds.

A specific example of our method is as follows:

A typical cane molasses is found by analysis to have the following composition:

| | Per cent |
|---|---|
| Sucrose content | 37 |
| Glucose content | 18 |
| Water content | 25 |
| Impurities (solid non-sugars) | 20 |

By the empirical rule above given, the amount of barium necessary in order to apply our process to this molasses is 0.429 pound for each pound of molasses.

A twenty per cent barium alkaline solution is prepared in which the dissolved alkali is either all in the form of dissolved barium oxide or not less than eighty per cent in the form of dissolved barium oxide and the remainder in the form of dissolved barium sulphide. For greatest economy, we prefer to use a barium solution of the following composition:

| | Per cent |
|---|---|
| Barium oxide, BaO | 17 |
| Barium sulphide, BaS | 3 |
| Water | 80 |

Each pound of this solution contains 0.1774 pound of barium.

To comply with the empirical rule given above, this barium solution is mixed with the cane molasses in the proportion of 2.42 pounds to 1 pound, both the molasses and the solution being maintained at a temperature of from 85° to 95° C. Barium saccharate precipitates at once in an easily filterable form. The mother liquor is found to have an alkaline concentration (determined as the ratio of barium oxide, BaO, plus barium sulphide, BaS, to the water present) of 6.67 per cent, which is sufficient to maintain the glucose decomposition products in solution since no barium silicate is present in the solution.

The barium saccharate precipitate is filtered out and washed with a seven per cent barium alkaline solution until free from all traces of the mother liquor. It is then subjected to further washings and is decomposed for a recovery of the sugar by known methods. The mother liquor and the first wash water are treated with sulphurous acid, or other mineral acid, to recover the barium contained in them.

What is claimed is:

1. A method for extracting sugar from a sugar solution containing glucose which comprises mixing with said solution a barium hydroxide solution free from barium silicate and containing sufficient barium to combine quantitatively with the glucose and with the sugar and, in addition, an excess of barium hydroxide equal, when figured in non-hydrolized form, BaO, to not less than five per cent of the water in the mixed solutions, so as to destroy the glucose, to precipitate the sugar as barium saccharate and to maintain the glucose decomposition products in solution, and separating the sugar-containing precipitate from the mother liquor containing the glucose decomposition products by filtration.

2. A method for extracting sugar from a sugar solution containing glucose, which comprises mixing with said solution a barium hydroxide solution free from barium silicate and containing sufficient barium to combine quantitatively with the glucose and with the sugar and, in addition, an excess of barium hydroxide equal, when figured in non-hydrolized form, BaO, to at least six per cent of the water in the mixed solutions, so as to destroy the glucose, to precipitate the sugar as barium saccharate and to maintain the glucose decomposition products in solution, and separating the sugar-containing precipitate from the mother liquid containing the glucose decomposition products by filtration.

3. A method for extracting sugar from a sugar solution containing glucose, which comprises mixing with said solution a solution of barium alkaline compounds free from barium silicate and containing sufficient barium to combine quantitatively with the glucose and with the sugar and, in addition, an excess of dissolved barium alkaline compounds equal, when figured in non-hydrolized form, to not less than five per cent of the water in the mixed solutions, at least eighty per cent of the barium alkaline compounds consisting of dissolved barium oxide, so as to destroy the glucose, to precipitate the sugar as barium saccharate and to maintain the glucose decomposition products in solution, and separating the sugar-containing precipitate from the mother liquor containing the glucose decomposition products by filtration.

4. A method for extracting sugar from a sugar solution containing glucose, which comprises mixing with said solution a solution of barium alkaline compounds free from barium silicate and containing sufficient barium to combine quantitatively with the glucose and with the sugar and, in addition, an excess of dissolved barium alkaline compounds equal, when figured in non-hydrolized form, to not less than five per cent of the water in the mixed solutions, approximately eighty-five per cent of the barium alkaline compounds consisting of dissolved barium oxide and approximately fifteen per cent consisting of dissolved barium sulphide, so as to destroy the glucose, to precipitate the sugar as barium saccharate and to maintain the glucose decomposition products in solution, and separating the sugar-containing precipitate from the mother liquor containing the glucose decomposition products by filtration.

5. A method for extracting sugar from a sugar solution containing glucose, which comprises mixing with said solution a solution of barium alkaline compounds free from barium silicate and containing sufficient barium to combine quantitatively with the glucose and with the sugar and, in addition, an excess of dissolved barium alkaline compounds equal, when figured in non-hydrolized form, to at least six per cent of the water in the mixed solutions, approximately eighty-five per cent of the barium alkaline compounds consisting of dissolved barium oxide and approximately fifteen per cent consisting of dissolved barium sulphide, so as to destroy the glucose, to precipitate the sugar as barium saccharate and to maintain the glucose decomposition products in solution, and separating the sugar-containing precipitate from the mother liquor containing the glucose decomposition products by filtration.

6. A method for extracting sugar from a sugar solution containing glucose, which comprises mixing with said solution a solution of alkaline barium compounds consisting principally of barium hydroxide and in sufficient quantity and sufficient concentration to provide barium to react quantitatively with the glucose and the sugar and, in addition, to maintain an alkalinity of not less than five per cent in the mixed solution after the barium has reacted with the glucose and the sugar, so as to destroy the glucose, to precipitate the sugar as barium saccharate and to maintain the glucose decomposition products in solution, separating the sugar-containing precipitate from the mother liquor by filtration, and washing the precipitate with a solution containing not less than five per cent of dissolved barium alkaline compounds to free the precipitates from all traces of the mother liquor and the glucose decomposition products contained therein.

7. A method for extracting sugar from a sugar solution containing glucose, which comprises mixing with said solution a solution of alkaline barium compounds consisting principally of barium hydroxide and in sufficient quantity and sufficient concentration to provide barium to react quantitatively with the glucose and the sugar and, in addition, to maintain an alkalinity of six and one-half per cent in the mixed solution after the barium has reacted with the glucose and the sugar, so as to destroy the glucose, to precipitate the sugar as barium saccharate and to maintain the glucose decomposition products in solution, separating the sugar-containing precipitate from the mother liquor by filtration, and washing the precipitate with a solution containing six and one-half per cent of dissolved barium alkaline compounds to free the precipitates from all traces of the mother liquor and the glucose decomposition products contained therein.

8. A method for extracting sugar from a concentrated sugar solution containing known quantities of sucrose and glucose which comprises mixing with said solution, a concentrated solution of barium alkaline compounds consisting principally of barium hydroxide and free from barium silicate and containing six atoms of barium for each five molecules of sucrose in the sugar solution and, in addition, two atoms of barium for each molecule of glucose in the sugar solution, so as to destroy the glucose, to precipitate the sugar as barium saccharate and to maintain the glucose decomposition products in solution, and separating the sugar-containing precipitate from the mother liquor containing the glucose decomposition products, by filtration.

9. A method for extracting sugar from a cane molasses of a concentration above 35° Bé., which comprises mixing with said molasses a solution containing over fifteen per cent of dissolved barium alkaline compounds consisting principally of barium hydroxide and in a quantity sufficient to provide six atoms of barium for each five molecules of sucrose in the molasses and, in addition, two atoms of barium for each molecule of glucose in the molasses, so as to destroy the glucose, to precipitate the sugar as barium saccharate and to maintain the glucose decomposition products in solution, and separating the sugar-containing precipitate from the mother liquor containing the glucose decomposition products, by filtration.

10. A method for extracting sugar from a cane molasses of a concentration of 37° Bé., which comprises mixing with said molasses a solution containing twenty per cent of dissolved barium alkaline compounds consisting principally of barium hydroxide and in a quantity sufficient to provide six atoms of barium for each five molecules of sucrose in the molasses and, in addition, two atoms of barium for each molecule of glucose in the molasses, so as to destroy the glucose, to precipitate the sugar as barium saccharate and to maintain the glucose decomposition products in solution, and separating the sugar-containing precipitate from the mother liquor containing the glucose decomposition products, by filtration.

11. A method for extracting sugar from a sugar solution containing glucose, which comprises mixing with said solution a barium hydroxide solution free from barium silicate and containing sufficient barium to react with the glucose to form barium salts of organic acids, to react with the sucrose to form insoluble barium saccharate, and, in addition, an excess of barium hydroxide equal, when figured in non-hydrolized form, BaO, to not less than five per cent of the water of the mixed solutions, so as to maintain the barium-glucose reaction products in solution, filtering the barium saccharate from the solution, and then treating the solution with a mineral acid to decompose the barium-glucose reaction products and recover the barium contained therein as the barium salt of said mineral acid.

In testimony whereof we have hereunto set our hands.

GEORGE P. MEADE.
RALPH N. TRAXLER.

---

CERTIFICATE OF CORRECTION.

Patent No. 1,884,798.  October 25, 1932.

GEORGE P. MEADE ET AL.

It is hereby certified that error appears in the printed specification of the above numbered patent requiring correction as follows: Page 2, line 12, after "barium" insert the word "hydroxide"; and line 19, for "57°" read "37°"; and that the said Letters Patent should be read with these corrections therein that the same may conform to the record of the case in the Patent Office.

Signed and sealed this 20th day of December, A. D. 1932.

(Seal)

M. J. Moore,
Acting Commissioner of Patents.

liquor containing the glucose decomposition products, by filtration.

10. A method for extracting sugar from a cane molasses of a concentration of 37° Bé., which comprises mixing with said molasses a solution containing twenty per cent of dissolved barium alkaline compounds consisting principally of barium hydroxide and in a quantity sufficient to provide six atoms of barium for each five molecules of sucrose in the molasses and, in addition, two atoms of barium for each molecule of glucose in the molasses, so as to destroy the glucose, to precipitate the sugar as barium saccharate and to maintain the glucose decomposition products in solution, and separating the sugar-containing precipitate from the mother liquor containing the glucose decomposition products, by filtration.

11. A method for extracting sugar from a sugar solution containing glucose, which comprises mixing with said solution a barium hydroxide solution free from barium silicate and containing sufficient barium to react with the glucose to form barium salts of organic acids, to react with the sucrose to form insoluble barium saccharate, and, in addition, an excess of barium hydroxide equal, when figured in non-hydrolized form, BaO, to not less than five per cent of the water of the mixed solutions, so as to maintain the barium-glucose reaction products in solution, filtering the barium saccharate from the solution, and then treating the solution with a mineral acid to decompose the barium-glucose reaction products and recover the barium contained therein as the barium salt of said mineral acid.

In testimony whereof we have hereunto set our hands.

GEORGE P. MEADE.
RALPH N. TRAXLER.

CERTIFICATE OF CORRECTION.

Patent No. 1,884,798.                                October 25, 1932.

GEORGE P. MEADE ET AL.

It is hereby certified that error appears in the printed specification of the above numbered patent requiring correction as follows: Page 2, line 12, after "barium" insert the word "hydroxide"; and line 19, for "57°" read "37°"; and that the said Letters Patent should be read with these corrections therein that the same may conform to the record of the case in the Patent Office.

Signed and sealed this 20th day of December, A. D. 1932.

(Seal)

M. J. Moore,
Acting Commissioner of Patents.

CERTIFICATE OF CORRECTION.

Patent No. 1,884,798.    October 25, 1932.

GEORGE P. MEADE ET AL.

It is hereby certified that error appears in the printed specification of the above numbered patent requiring correction as follows: Page 2, line 12, after "barium" insert the word "hydroxide"; and line 19, for "57°" read "37°"; and that the said Letters Patent should be read with these corrections therein that the same may conform to the record of the case in the Patent Office.

Signed and sealed this 20th day of December, A. D. 1932.

(Seal)

M. J. Moore,
Acting Commissioner of Patents.